(12) United States Patent
Edara et al.

(10) Patent No.: US 9,060,295 B2
(45) Date of Patent: Jun. 16, 2015

(54) PRIORITIZING APPLICATION DATA FOR TRANSMISSION IN A WIRELESS USER DEVICE

(71) Applicant: Amazon Technologies, Inc., Reno, NV (US)

(72) Inventors: Kiran K. Edara, Cupertino, CA (US); Rama Krishna Kamarajugadda, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/224,843

(22) Filed: Mar. 25, 2014

(65) Prior Publication Data

US 2014/0241275 A1    Aug. 28, 2014

Related U.S. Application Data

(63) Continuation of application No. 13/285,339, filed on Oct. 31, 2011, now Pat. No. 8,711,699.

(51) Int. Cl.
*H04W 4/00*   (2009.01)
*H04W 28/02*  (2009.01)
*H04W 72/12*  (2009.01)
(Continued)

(52) U.S. Cl.
CPC .......... *H04W 28/0268* (2013.01); *H04W 72/10* (2013.01); *H04W 72/1242* (2013.01); *H04W 72/1268* (2013.01); *H04W 28/0236* (2013.01); *H04W 28/12* (2013.01)

(58) Field of Classification Search
None
See application file for complete search history.

(56) References Cited

U.S. PATENT DOCUMENTS

2007/0275728 A1*  11/2007  Lohr et al. ............. 455/450
2009/0129326 A1*  5/2009   Kim et al. .............. 370/329
2010/0098011 A1   4/2010   Pelletier et al.
(Continued)

FOREIGN PATENT DOCUMENTS

EP    1 172 766    1/2002
EP    1 608 194    12/2005
EP    1 643 690    4/2006

OTHER PUBLICATIONS

PCT International Preliminary Report on Patentability and Written Opinion of the International Searching Authority mailed May 15, 2014, for International Application No. PCT/US2012/062564 filed Oct. 30, 2012, 9 pages.

(Continued)

*Primary Examiner* — Chi H Pham
*Assistant Examiner* — Soon-Dong D Hyun
(74) *Attorney, Agent, or Firm* — Lowenstein Sandler LLP

(57) ABSTRACT

Methods and systems for prioritizing application data in a wireless user device are disclosed. A user device receives, at an application transport bearer (ATB) entity of a protocol layer of a network interface of a user device, at least a portion of a data packet originating from an application identified for prioritized data transfer on the user device. Then, the ATB entity of the user device schedules the data packet ahead of any data packets processed at any network-established data radio bearer (DRB) entities on the same protocol layer as the ATB entity. The ATB entity of the user device is also configured to operate on a protocol layer of a subset of protocol layers on the user device and is configured by the user device with a higher priority parameter than any of the network-established DRB entities on the same protocol layer as the ATB entity.

20 Claims, 6 Drawing Sheets

(51) Int. Cl.
*H04W 28/12* (2009.01)
*H04W 72/10* (2009.01)

(56) References Cited

U.S. PATENT DOCUMENTS

| | | |
|---|---|---|
| 2010/0309788 A1* | 12/2010 | Ho et al. .................. 370/236 |
| 2010/0330995 A1 | 12/2010 | Aoyama et al. |
| 2011/0261747 A1 | 10/2011 | Wang et al. |
| 2012/0250601 A1* | 10/2012 | Choi et al. ............... 370/315 |
| 2012/0269150 A1* | 10/2012 | Delorme et al. .......... 370/329 |
| 2012/0282875 A1 | 11/2012 | Park et al. |
| 2013/0107843 A1 | 5/2013 | Aoyama et al. |

OTHER PUBLICATIONS

Siemens, "Multiple Parallel Bearers Concept Paper," 9 pages, [retrieved on May 22, 2001].

Lucent Technologies, "Improved QoS handling for UL scheduling," 2 pages, [retrieved on Aug. 23, 2006].

PCT International Search Report and Written Opinion of the International Searching Authority mailed Feb. 28, 2013, for International Application No. PCT/US2012/062564 filed Oct. 30, 2012, 11 pages.

* cited by examiner

PRIORITIZING APPLICATION DATA FOR TRANSMISSION IN A WIRELESS USER DEVICE

CROSS-REFERENCE TO RELATED APPLICATION

This application is a continuation of U.S. patent application Ser. No. 13/285,339 filed on Oct. 31, 2011, titled "Prioritizing Application Data for Transmission in a Wireless User Device," the entirety of which is hereby incorporated herein by reference.

BACKGROUND

In today's wireless communication networks, user devices such as electronic book readers, cellular telephones, personal digital assistants (PDAs), portable media players, tablet computers, and netbooks use technologies like Global System for Mobile Communications (GSM or 2G), Universal Mobile Telecommunications System (UMTS or 3G), or more recent 3GPP Long Term Evaluation (LTE or 4G), Code Division Multiple Access (CDMA), or World Interoperability for Microwave Access (WiMax) for wireless communication. Data from user applications on these wireless user devices is sent over-the-air to a base station using data radio bearers (DRBs). Using DRBs, data from different user applications on the user device passes through different protocol layers, such as Packet Data Convergence Protocol (PDCP) layer, Radio Link Control (RLC) layer, and Media Access Control (MAC) layer.

Data download and upload on any particular DRB is governed by a defined quality of service (QoS) between the network and the user device. This QoS is established by the network, meaning that the network provides for a guaranteed data rate, packet delay budget, and acceptable packet loss rate for the particular DRB of the user device.

When an application is started on a user device, the network providing the wireless communication for the user device will either, depending on the QoS required for the application, establish a new DRB on the user device or request the user device to share an existing DRB set up on the user device. In either case (new DRB or existing DRB), once the network configures the DRB with a given priority, typically there is no way for applications on the user device to utilize any other priority while data is passing through the protocol layers of the network interface of the user device. This can result in data from any one application overwhelming the queues at the PDCP, RLC, MAC and PHY layers in the DRB, and slowing down data from other applications without a way to prioritize data from one application over another.

Consider an example of a portable wireless device that is simultaneously using applications such as a video upload session, an e-book session, and various web browser sessions. With existing implementations of wireless technologies, all packets from the above user device applications will be sent over-the-air on DRBs with the same priority. In other words, the DRBs do not distinguish priority based on the source application of the data packet. As a result, any one application can overwhelm the queues at any of the protocol layers, and slow down or starve data from other applications. For example, the video upload session may be sending and receiving video data packets, while the web browser session is sending and receiving simple text data. In this example scenario, if the packets are sent over the same DRB (as they are in existing standards), then these packets will not be differentiated in terms of priority and the video upload session packets will overwhelm the DRB channel and ultimately slow down transmission for the simple text data packets.

LTE technology currently supports data prioritization based on the Quality Control Indicator (QCI) at the application level and prioritization at the logical channel level in the MAC layer. However, as a real-time use case, when specific application data is high priority in nature, but its QCI is low priority (according to 3GPP LTE specification published QCI table), then this application's data will be transported with low priority or the same priority as any other applications' data. In effect, this higher-priority application data may still be slowed down and experience negative performance effects due to other application data clogging the DRB pipe. Moreover, the above LTE technology data prioritization scheme requires the network's help to implement this application-specific prioritization and, as a result, such implementation is not guaranteed. In addition, such a network-implemented solution requires a premium charge for this service.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for prioritizing application data for transmission in a wireless user device are disclosed. A user device may be any mobile or content rendering device. Examples of such user devices include electronic book readers, cellular telephones, personal digital assistants (PDAs), portable media players, tablet computers, netbooks, and the like. A user device may connect to a network to obtain content from a server or to perform other activity.

In one embodiment, a mechanism to internally prioritize application data packets within a wireless user device without involvement from a network is disclosed. In particular, embodiments of the invention prioritize data packets from certain applications over data packets from other applications when they pass through the protocol layers of the network interface of the user device. For ease of explanation, the following description of embodiments of the idea is discussed in the context of 4G (LTE) technology. However, one skilled in the art will appreciate that embodiments of the invention are not limited to this implementation and can be extended to be implemented in other wireless technologies, such as GSM, UMTS or WiMax, to name a few examples.

Embodiments of the invention create and setup a new high-priority bearer channel, referred to herein as an application transport bearer (ATB), across the different protocol layers of the user device. In some embodiments, the protocol layers may include the PDCP, RLC, and MAC layers. Then, application packets that are mapped to this high-priority ATB are prioritized at each protocol layer over other packets mapped to the existing DRB(s) established by the network on the user device, no matter the QCI rating of the data packet. In some embodiments, prioritization of the ATB data packets is accomplished by using techniques such as cutting ahead into the queue at each layer and/or prioritizing scheduling for these packets at each layer.

Figure 1:
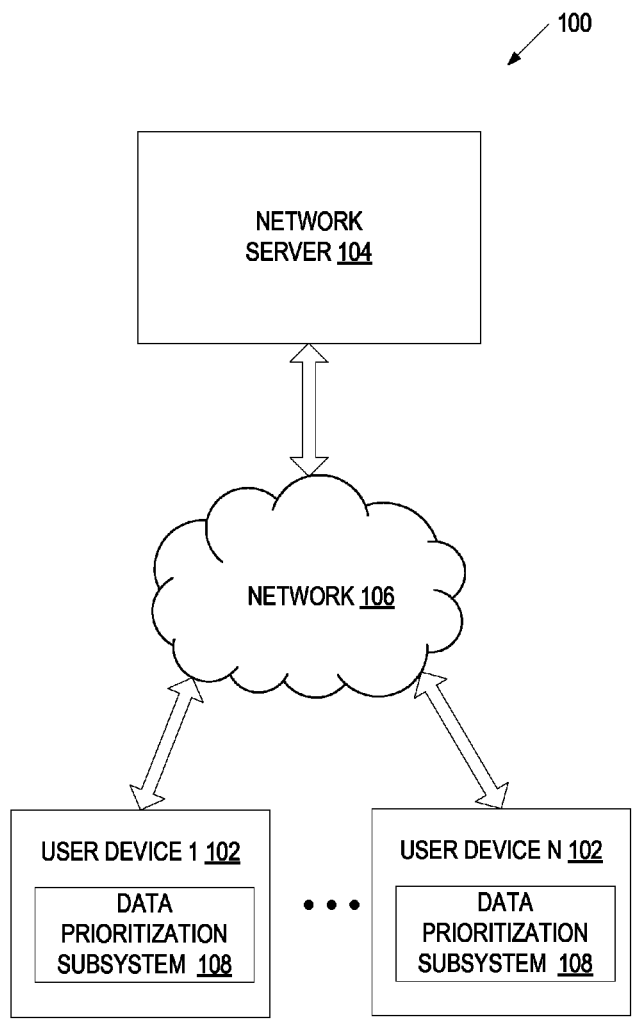
FIG. 1 is a block diagram of an exemplary network architecture in which embodiments of the invention may operate.

FIG. 1 is a block diagram of exemplary network architecture 100 in which embodiments of the invention may operate. The network architecture 100 may include a server 104 and multiple user devices 102 coupled to the server 104 via a network 106 (e.g., an operator network, a public network such as the Internet, or a private network such as a local area network (LAN)).

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 104 may be a network operator (service provider) server, a network-based server (referred to as a cloud server), a content provider server, an access point provider server, or any other server that provides various services to user devices 102 via the network 106. In some embodiments, server 104 may refer to a service or entity within the network infrastructure of the network operator, such as an eNodeB entity or the Evolved Packet Core (EPC). In one embodiment, the sever 104 downloads items, upgrades, and/or provides other information to the user devices 102 via the network 106. The server 104 also receives various requests, instructions and other data from the user devices 102 via the network 106. The server 104 may include one or more machines (e.g., one or more server computer systems, routers, gateways) that have processing and storage capabilities to provide the above functionality.

Communication between the server 104 and a user device 102 may be enabled via any communication infrastructure. One example of such an infrastructure includes a combination of a wide area network (WAN) or a VPN and wireless infrastructure, which allows a user to use the user device 102 to purchase items and consume items without being tethered to the server 104 via hardwired links. The wireless infrastructure may be provided by a network operator (service provider) system that can be implemented using various data processing equipment, communication towers, etc. Alternatively, or in addition, the network operator system may rely on satellite technology to exchange information with the user device 102. Yet alternatively, or in combination, the wireless infrastructure may be provided by an access point (e.g., WiFi access point) provider system.

The communication infrastructure may also include a communication-enabling system that serves as an intermediary in passing information between the server 104 and the wireless network operator. The communication-enabling system may communicate with the wireless network operator via a dedicated channel, and may communicate with the server 104 via a non-dedicated communication mechanism, e.g., a public network such as the Internet.

The server 104 may pay the network operator a fee based on the aggregate use of the network operator system by all of the user devices 102. The server 104 may recoup these costs through fees charged to the end-users separately or as part of other purchases (e.g., purchase of digital content) made by the end-users. Alternatively, the network operator may submit bills directly to individual users, or may submit bills to either the server 104 (in aggregate) or to the individual users, at the option of the individual respective users.

As part of the procedure by which a user device 102 attaches to the wireless network of the server 104, the user device 102 is assigned an Internet Protocol (IP) address by the server 104 and has at least one bearer configured on the user device 102 by the server 104. A bearer is an entity that routes IP packets with a defined Quality of Service (QoS). In one embodiment, the first established bearer is the default bearer that remains established throughout the lifetime of the data network connection of the user device 102 in order to provide the user device 102 with always-on connectivity to that data network. Additional bearers, called dedicated bearers, can also be established at any time during or after completion of the default bearer establishment. These dedicated bearers are configured and established on the user device 102 by an operator network element (not shown) communicably coupled to the network server 104.

Each bearer on a user device 102 has associated QoS parameters, such as Quality Control Indicator (QCI), Guaranteed Bit Rate (GBR), and Maximum Bit Rate (MBR). There is a limited number of QCIs that have been standardized so that vendors may all have the same understanding of underlying service characteristics and so that the network operator (e.g., server 104) can expect uniform traffic-handling behavior through the network regardless of equipment manufacturers. Each QCI is characterized by priority, packet delay budget, and acceptable packet loss rate. As a result, any packets mapped to the same bearer will all receive the same bearer-level packet forwarding treatment, such as the same scheduling policy, queue management policy, rate shaping policy, and RLC configuration.

Currently, present standards only provide for different QoS parameters based on the type of data traveling over the network, and not on the originating application of the data. As such, all web-based data packets from a variety of user applications are generally routed through the same bearer on a user device, receiving the same bearer-level packet forwarding treatment.

Embodiments of the invention utilize a data prioritization subsystem 108 of user device 102 to internally prioritize application packets within a wireless user device 102 without requiring the network server 104 to configure and establish a new bearer on the user device 102. When an application identified for prioritized data transfer is started on the user device 102, the data prioritization subsystem 108 will establish a new ATB on the user device 102 that is specifically configured to prioritize the application's data packets over packets transported through existing DRBs in the user device 102. Then, application packets that are mapped to this high-priority ATB are prioritized at each protocol layer of the network interface over other data packets mapped to existing DRB(s) that were established on the user device by the network server 104. In some embodiments, the prioritization of the packets traveling over the ATB may be configurable so that it does not affect other communication mechanisms provided by the user device 102, such as VoIP sessions, voice calls, and so on.

This prioritization of ATB data packets in embodiments of the invention occurs no matter the QCI rating of the ATB data packet. In some embodiments, prioritization of the ATB data packets is accomplished by using techniques such as cutting ahead into the queue at each protocol layer and/or prioritizing scheduling for these packets at each protocol layer. Data prioritization subsystem 108 is now described in further detail with respect to FIG. 2.

Figure 2:
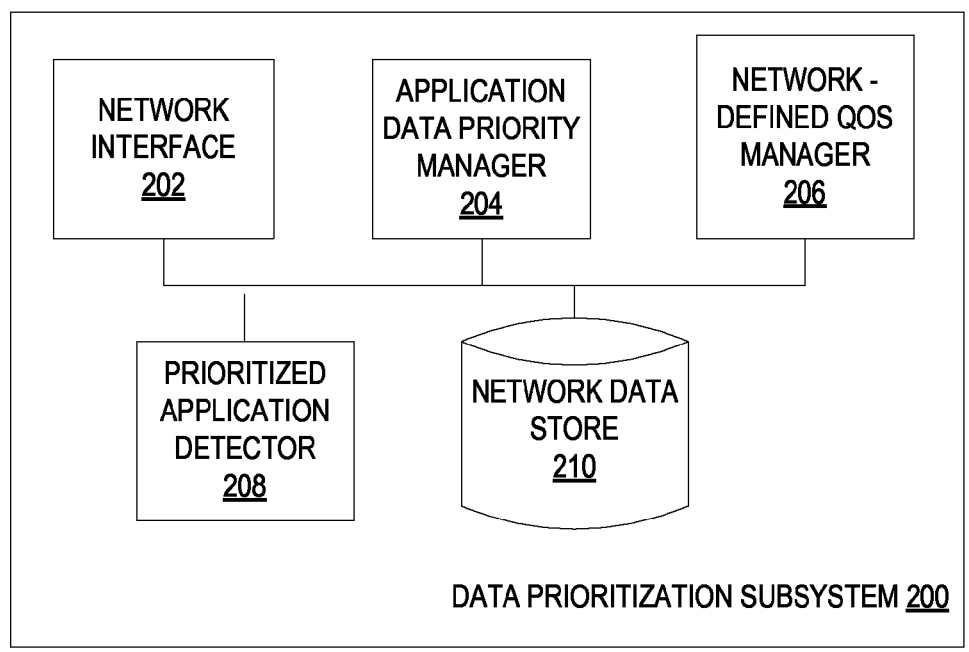
FIG. 2 is a block diagram of one embodiment of a data prioritization subsystem.

FIG. 2 is a block diagram of one embodiment of a data prioritization subsystem 200 hosted by a user device. In one embodiment, data prioritization subsystem 200 is the same as data prioritization subsystem 108 of FIG. 1. Data prioritization subsystem 200 may include a network interface 202, application data priority manager 204, network-defined QoS manager 206, prioritized application detector 208, and a network data store 210. The components of the data prioritization subsystem 200 may represent modules that can be combined together or separated into further modules, according to some embodiments.

In one embodiment, network interface 202 interacts with a network server (such as network server 104 described with respect to FIG. 1) to receive protocol layer configuration information for one or more DRBs being established on the user device. The configuration data for each DRB configured by the network server on the user device includes QoS parameters for the DRB. The QoS parameters may include QCI, GBR, and MBR parameters. In some embodiments, each QCI is characterized by priority, packet delay budget, and acceptable packet loss rate. The QoS parameter information may be passed to the network QoS manager 206 in order to create the DRB entity on the user device according to the network-defined parameters. In addition, the DRB-specific parameters may be stored in network data store 210 for later reference.

In one embodiment, when an application of the user device starts, the prioritized application detector 208 determines whether this application should be afforded its own ATB on the user device. In one embodiment, the prioritized application detector 208 may reference the network data store 210 with identifying information of the application to determine whether records of the network data store 210 list the application as configured for prioritization on the user device. In other embodiments, the application may send a message or other indicator to the prioritized application detector 208 informing the subsystem 200 of its prioritization status. In some embodiments, the user device is pre-configured by the device manufacturer with identifications of applications that are identified for prioritized data transfer. In other embodiments, user device can be provisioned over the air to notify which applications should be considered for ATB.

If the application is configured for data prioritization over the network, then the application data priority manager 204 establishes a new ATB on the user device. This ATB is specifically used to prioritize the application's data packets over other data packets transported on existing DRBs of the user device. In one embodiment, application data priority manager 204 creates entities for the ATB at each a subset of protocol layers of the network interface of the user device, which together provide the overall functionality of the new ATB for the prioritized application data.

Data packets of the prioritized application are mapped to the new ATB, and then are prioritized by the ATB entity at each protocol layer over other data packets at corresponding DRB entities on the same protocol layer. This prioritization occurs at each protocol layer ATB entity until the application packet data reaches the PHY layer and is transported on a shared communication channel(s) to the network. In some embodiments, individual channels may be utilized at the PHY layer instead of a shared channel infrastructure.

In one embodiment, application data priority manager 204 replicates the signaling messages sent from the network server to create the DRBs on the user device, while only changing the individual parameters within those messages. Then, the updated signaling message is utilized to create the ATB entity at each protocol layer. The application data priority manager 204 may reference network-provided priority parameters (e.g., stored in the network data store 208) of the existing DRBs on the user device in order to determine the required priority parameters needed to create the ATB entity at each protocol layer. In one embodiment, the application data priority manager 204 configures a priority parameter in the signaling message establishing the ATB entity at a protocol layer, where this configured priority parameter is higher in priority than the priority parameters of any existing DRBs at the same protocol layer as the ATB entity being established.

Figure 3:
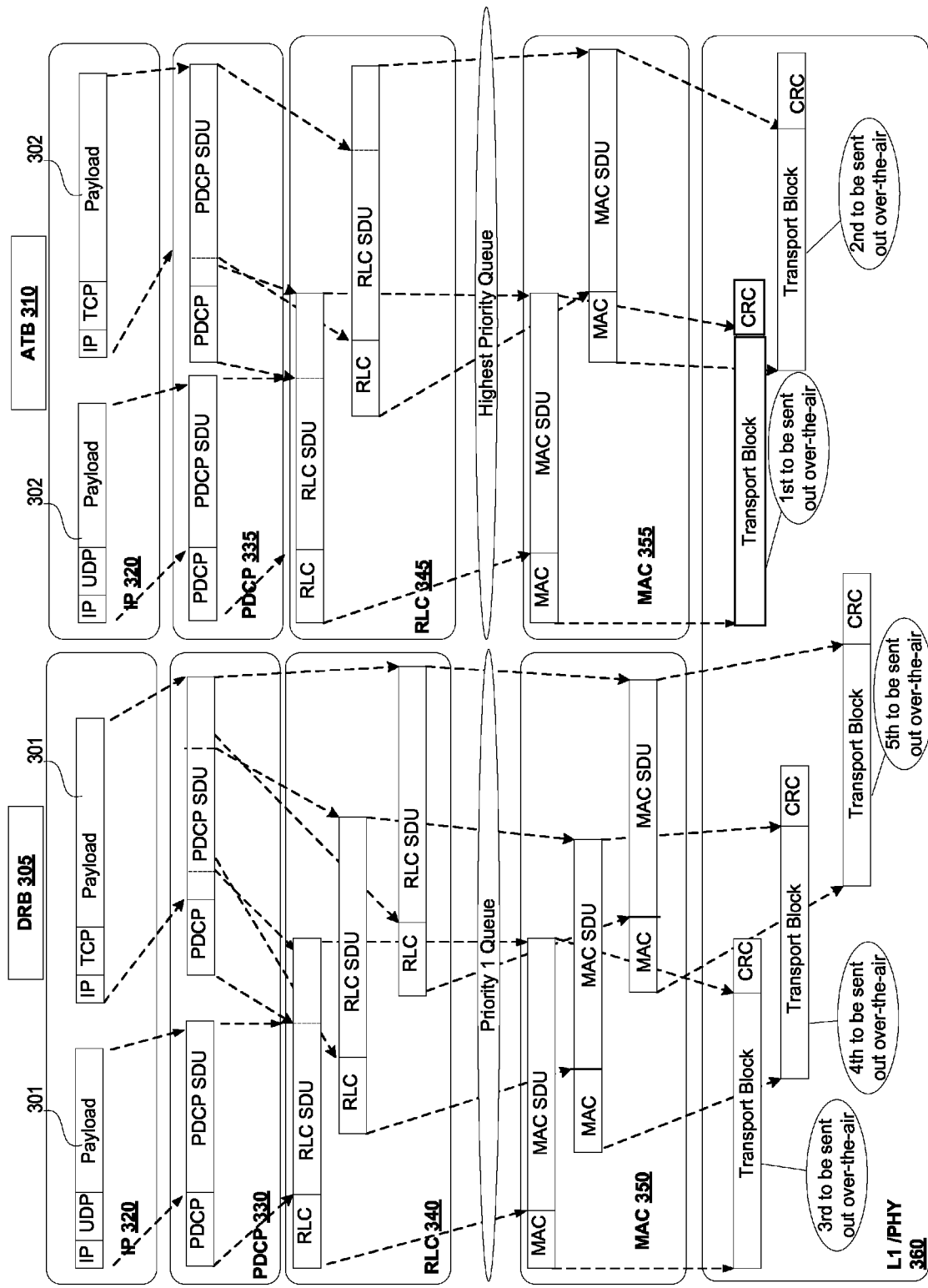
FIG. 3 is a block diagram of one embodiment of data packet transmission through protocol layers of a user device network interface implementing a user device-defined bearer channel to prioritize application data.

FIG. 3 is a block diagram illustrating a detailed view of data packet transmission through protocol layers of a user device network interface 300 implementing a user device-defined bearer channel to prioritize application data according to embodiments of the invention. In one embodiment, user device network interface 300 may be part of user device 102 described with respect to FIG. 1.

As shown in FIG. 3, network interface 300 includes a DRB 305 and an ATB 310. Although only one DRB 305 and ATB 310 are shown in FIG. 3, one skilled in the art will appreciate that multiple DRBs and/or ATBs may be configured and established on a user device. Each of DRB 305 and ATB 310 comprise entities at each protocol layer that, when working together, create a channel through the network interface 300. In some embodiments, the protocol layers may include an IP layer 320, PDCP layer 330, RLC layer 340, MAC layer 350, and L1l/PHY layer 360. One skilled in the art will appreciate that other protocol layers may be used based on different communication standards and embodiments of the invention may be extended to these protocol layers as well. Network interface 300 is illustrated with the noted protocol layers 320-360 for exemplary purposes only and for ease of understanding of embodiments of the invention.

In one embodiment, DRB 305 is established by the network with network-defined priority parameters, while ATB 310 is established by the user device with user device-defined priority parameters. Application data packets 301 that do not fall under application-specific prioritization are mapped to DRB 305 at the IP layer 320, while prioritized application-specific packets 302 are mapped to ATB 310 at the IP layer 320. In some embodiments, the IP layer mapping associates an application on the user device with an IP address and port number associated with the new ATB. For example, if the destination IP or port number indicates that one or more data packet are destined for a particular vendor associated with the application, then those packets can be prioritized.

The data packets 301, 302 mapped to each bearer 305, 310 make their way through the various protocol layers. The priority parameters used to configure the ATB entities at each protocol layer cause the ATB data packets 302 to be prioritized and scheduled before any DRB data packets 301 at the corresponding protocol layer on DRB 305.

In embodiments of the invention, DRB and ATB entities exist at a subset of protocol layers of the network interface 300 in order to provide the functionality of the DRB 305 and ATB 310 throughout the network interface 300. An "entity"

may refer to a physical component or a logical component that is used to implement data packet scheduling and prioritization at the protocol layer. For example, an entity may be a queue that is implemented in memory as a buffer component. In other embodiments, an entity may be implemented logically through the use of messaging.

In one embodiment, at the PDCP layer, an ATB PDCP entity 335 is created by the user device for ATB 310. This ATB PDCP entity 335 is configured with highest priority over all existing DRBs PDCP entities 330 on the user device. In one embodiment, the ATB PDCP entity 335 has the same network-defined parameters as its DRB PDCP counterparts 330, except for the priority parameters. The priority parameters of the ATB PDCP entity 335 are higher than its counterparts. As a result, any data packets 302 posted to the ATB PDCP entity 335 are handled with higher priority than data packets 301 posted to other DRBs PDCP entities, and will move on to the next protocol layer before any DRB data packets 301 at the PDCP layer. For example, in a system where the PDCP layer is implemented as a single task/thread, the ATB PDCP entity 335 may be prioritized inside this single thread so that any new incoming data to the ATB PDCP entity 335 is read and processed ahead of all counterpart DRB PDCP entities 330.

Establishing an ATB RLC entity 345 in some embodiments is similar to establishing the ATB PDCP entity 335. For the ATB RLC layer, an ATB RLC entity 345 is created with highest priority over counterpart DRB RLC entities 340. In a system where the RLC layer is implemented as a separate thread for each RLC entity, the ATB RLC entity 345 may run as a highest-priority thread. In a system where the RLC layer is implemented as a single task/thread, the ATB RLC entity 345 may be prioritized inside this single thread. For example, any new incoming data to the new ATB RLC entity 345 is read and processed ahead of counterpart DRB RLC entities 340.

Establishing an ATB MAC entity 355 in embodiments is also similar to establishing the ATB PDCP entity 335 and the ATB RLC entity 345. The ATB MAC entity 355 is configured with a higher priority than its counterpart DRB MAC entities 350 on the user device. In one embodiment, the ATB and DRB MAC entities 350, 355 provide services to corresponding ATB and DRB RLC entities over logical Dedicated Traffic Channels (DTCHs), with the scheduling of uplink data controlled by signaling the following: priority level, Prioritized Bit Rate (PBR), and Bucket Size Duration (BSD). In some embodiments, the priority level of the ATB logical DTCH channel 355 will be higher than its counterpart DRB MAC DTCH channels 350. In addition, in some embodiments, retransmissions at the MAC layer take high priority over new transmissions. For example, if the ATB MAC layer data packets are in retransmission buffers, then they take priority after any control information packets in the network interface, but before any data packets at any corresponding DRB MAC entities.

As shown in FIG. 3, the use of the ATB entities at each protocol layer, as well as the initially mapping of data packets to the ATB 310 at the IP layer 320, keep the ATB-assigned packets separate from DRB data packets along all protocol layers of the network interface 300. This results in the prioritized application-specific data packets being first in line when they reach the communication channel(s) at the L1/PHY layer 360, "jumping ahead" of any DRB data packets. As such, embodiments of the invention allow data packets from any specially-identified prioritized applications to be prioritized on the user device without any direct configuration from the network.

When the ATB data packets are sent to the network, they are sent using the IDs (e.g., DRB ID, RLC ID, etc.) configured by the network (in the signaling message) for default or dedicated DRBs. When the network receives these ATB packets, it thinks that the ATB packets are one of the DRB packets (based on the IDs). By copying and duplicating the signaling message received from the network to establish the DRBs, and re-using these messages (with changed priority parameters) to configure different protocol layers for an ATB, embodiments of the invention are able to establish and successfully transmit prioritized data on the user device utilizing an ATB that is separate from any network-established DRBs.

Although embodiments of the invention may be better realized when simultaneously operating multiple applications on the user device, embodiments of the invention are equally applicable to single application scenarios.

Figure 4:
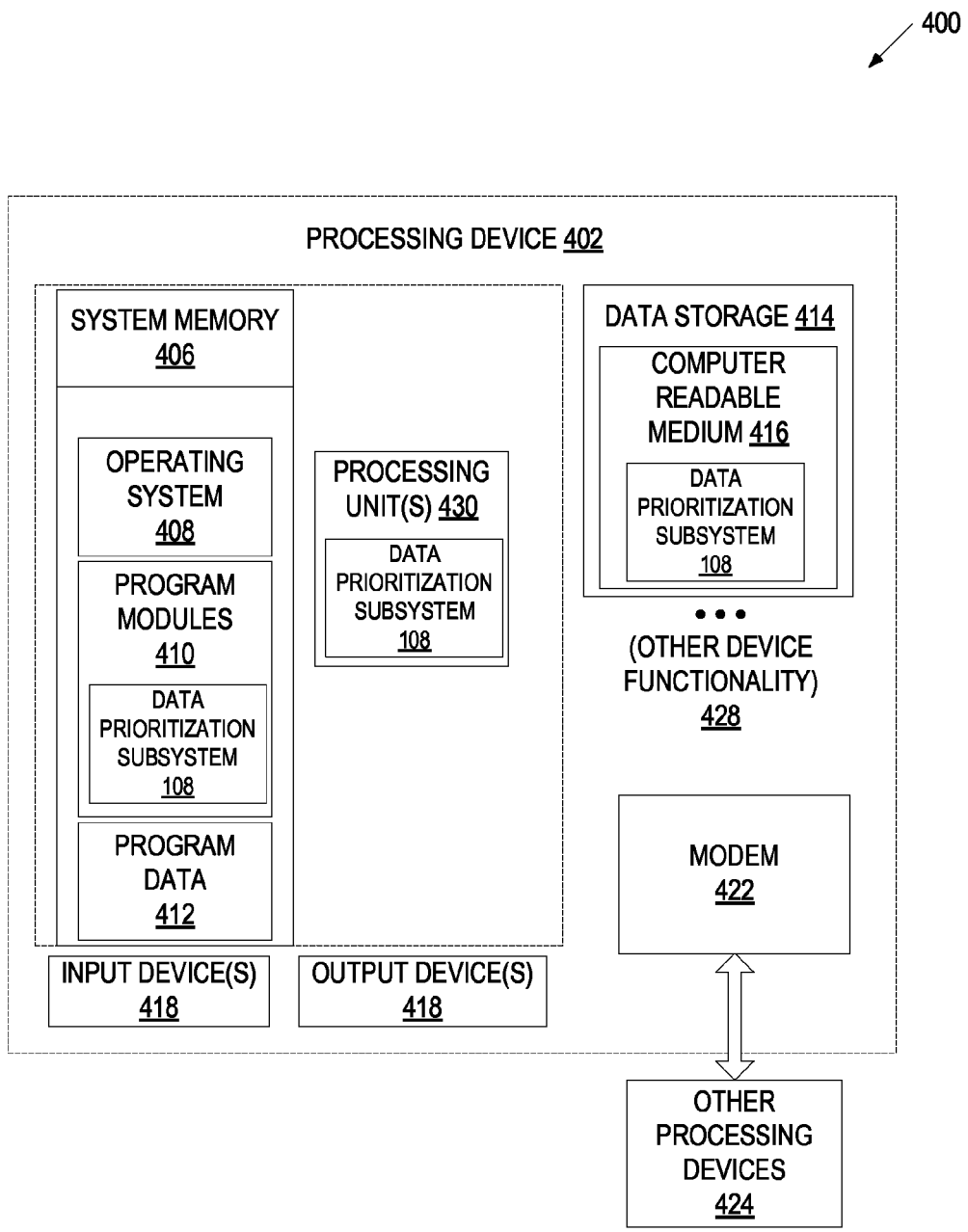
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 may further be in the form of a computer system within which a set of instructions, for causing the machine to perform any one or more of the methodologies discussed herein, may be executed. In alternative embodiments, the machine may be connected (e.g., networked) to other machines via a network (not shown), where network may be a LAN, an intranet, an extranet, or the Internet. In some embodiments, the machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including data prioritization subsystem 108, program data 412, and/or other components. The user device 400 performs functions by using the processing unit(s) 404 to execute the data prioritization subsystem 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the data prioritization subsystem 108) embodying any one or more of the methodologies or functions described herein. As shown, instructions of the data prioritization subsystem 108 may also reside, completely or at least partially, within the system memory 406 and/or within the processing unit(s) 430 during execution thereof by the user device 400, the system memory 406 and the processing unit(s) 430 also constituting computer-readable media. The instructions of the data prioritization subsystem 108 may further be transmitted or received over a network.

While the computer-readable storage 416 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with other computing devices 424, such as remote computers, the server 104, and so forth. The wireless modem 422 may allow the user device 400 to receive a voice call and also communicate with the server 104 in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 400. As indicated by the label "Other Device Functionality" 428, the user device 400 may include additional functions.

Figure 5:
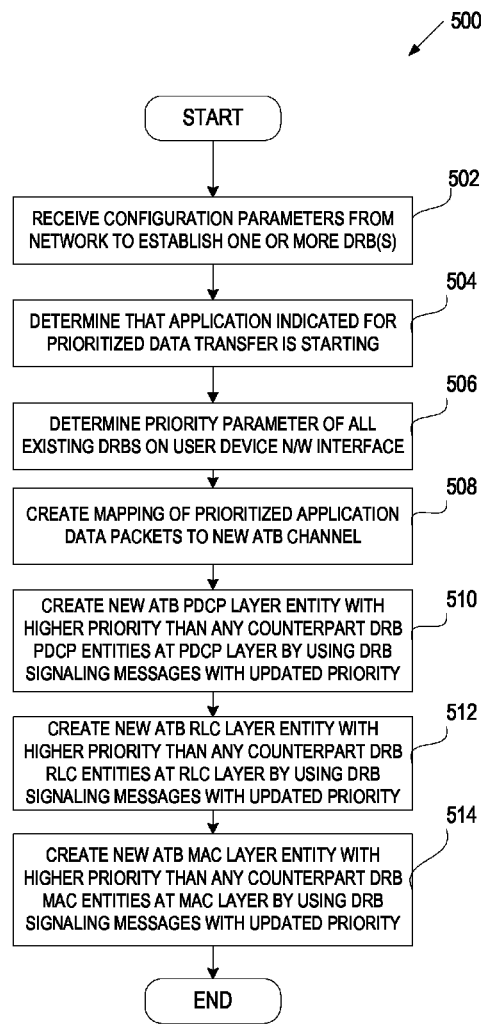
FIG. 5 is a flow diagram of one embodiment of a method for establishing a user device-defined bearer channel to transport data packets for a prioritized application.
Figure 6:
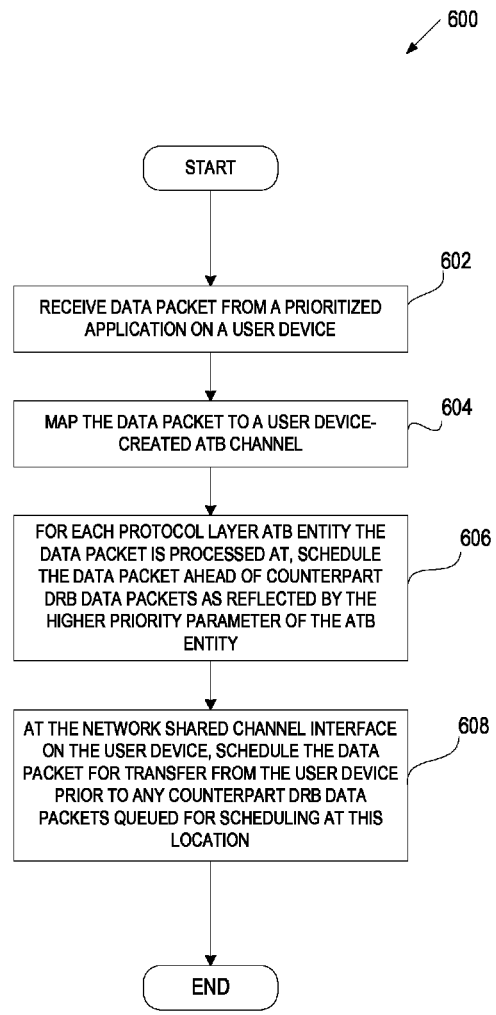
FIG. 6 is a flow diagram of one embodiment of a method for uplink transmission of a data packet of a prioritized application via a user device-defined bearer channel.

FIGS. 5 through 7 are flow diagrams of some embodiments of user device methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a user device (e.g., a data prioritization subsystem 108 of user device 102 of FIG. 1).

FIG. 5 is a flow diagram of one embodiment of a method 500 for establishing a user device-defined bearer channel to transport data packets for a prioritized application. Method 500 begins at block 502 where configuration parameters used to establish one or more DRBs on the user device are received via a network. In one embodiment, service is provided by a network operator that enables a communication infrastructure for the user device to receive and transmit data packets. In some embodiments, the configuration parameters may include QoS parameters for the one or more DRBs. The QoS parameters may include QCI, GBR, and MBR parameters. Each QCI is characterized by priority, packet delay budget, and acceptable packet loss rate. These configuration parameters are used by the user device to establish and configure the one or more DRB entities on the user device.

At block 504, the user device determines that an application identified for prioritized data transfer is starting. In one embodiment, the user device may use identifying information of the application to locate any records in a network data store on the user device that identify the application as configured for prioritized data transfer. In other embodiments, the application itself may send a message or other indicator to the data prioritization subsystem of the user device informing the subsystem of its prioritization status. Subsequently, the priority parameter of all existing DRBs established on the user device are determined at block 506. In some embodiments, the previously-mentioned network data store may hold this information. In other embodiments, a configuration command may be used to obtain this information.

Then, at block 508, the user device creates a new mapping for the network interface associating the prioritized application to a new ATB channel entity on the network interface of the user device. This mapping associates all data packets originating from the prioritized application (or destined for the prioritized application) to the ATB channel entity. In some embodiments, the mapping associates the prioritized application with an IP address and port number associated with the new ATB channel entity.

At block 510, a new ATB PDCP entity is created. In one embodiment, the ATB PDCP entity is created using the same signaling message(s) used to create the one or more counterpart DRB PDCP entities on the user device, with changes to the parameters included in the message. Specifically, the priority parameter of the signaling message is changed to give the ATB PDCP entity a higher priority than any other existing DRB on the user device. At blocks 512 and 514, ATB entities are created at each of the RLC and MAC layers, similar to the procedure used to create the ATB PDCP entity at block 510. Although blocks 510-514 identify the protocol layers of PDCP, RLC, and MAC, one skilled in the art will appreciate that other protocol layers may be referenced and implicated in embodiments of the invention depending on the particular communication standard implemented.

FIG. 6 is a flow diagram of one embodiment of a method 600 for uplink transmission of a data packet of a prioritized application via a user device-defined bearer channel. Method 600 begins at block 602 where a data packet from a prioritized application is received on a user device. The prioritized application is running on the user device, and has been identified as receiving prioritized data transfer treatment for its data packets on the user device. At block 604, the data packet is mapped to a user device-defined bearer channel. In one embodiment, this user-defined bearer channel is an ATB channel that was configured and established by the user device without interaction from a network. In some embodiments, the mapping occurs at an IP protocol layer of the network interface of the user device, using IP addresses and port numbers.

At block 606, the data packet passes through a series of ATB entities, one entity at each protocol layer of the network interface. At each protocol layer ATB entity, the data is processed and scheduled ahead of any counterpart DRB packets. This prioritized processing and scheduling reflects the higher priority set in the parameters of each protocol layer ATB entity. Lastly, at block 608, the data packet is scheduled for transmission from the user device before any counterpart DRB data packets that are also waiting for scheduling at the network channel interface on the PHY layer of the user device.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An electronic device comprising:
    a processor;
    memory coupled to the processor;
    a network interface module communicably coupled to the processor and the memory; and
    a data prioritization subsystem stored in the memory and executed by the processor, wherein the processor in conjunction with the data prioritization subsystem and the network interface module is configured to:
        determine that data of a first application of the electronic device has a higher priority than data of a second application of the electronic device, wherein both the data of the first application and the data of the second application have a same quality control indicator (QCI) rating;
        receive a message from a communication network, wherein the message includes information about a data radio bearer (DRB) channel assigned to the data of the first application and the data of the second application, the DRB channel having an associated first set of priority parameters;
        establish, based on the DRB channel, for each protocol layer of a communication protocol stack, an application transport bearer (ATB) channel having a second set of priority parameters, wherein the second set of priority parameters are higher in priority than the first set of priority parameters;
        associate the data of the first application to the respective ATB channel at each protocol layer; and
        prioritize, for sending over the communication network, the data of the first application over the data of the second application at each protocol layer.

2. The electronic device of claim 1, wherein the network interface module is further configured to determine that the first application has the higher priority by referring to a network data store configured to store priority information associated with the first application.

3. The electronic device of claim 1, wherein the network interface module is further configured to receive a message from the first application comprising priority information associated with the first application.

4. The electronic device of claim 1, the electronic device configured to store priority information associated with the first application identified by a manufacturer of the electronic device.

5. The electronic device of claim 1, wherein the network interface module is further configured to receive an over-the-air communication comprising priority information associated with the first application.

6. The electronic device of claim 1, wherein the network interface module is further configured to prioritize the data of the first application over the data of the second application at each protocol layer by at least one of: cutting ahead in a queue at each protocol layer or prioritizing scheduling of one or more packets of the data of the first application at each protocol layer.

7. A method comprising:
    determining, by a processor, that data of a first application of an electronic device has a higher priority than data of a second application of the electronic device;
    receiving, by the processor, a message comprising information associated with a data radio bearer (DRB) channel assigned to the data of the first application and the data of the second application, the DRB channel having an associated first set of priority parameters;
    establishing, by the processor, based on the DRB channel, for each protocol layer of a communication protocol stack, an application transport bearer (ATB) channel having a second set of priority parameters, wherein the second set of priority parameters are higher in priority than the first set of priority parameters;
    associating, by the processor, the data of the first application to the ATB channel at each protocol layer; and prioritizing, by the processor, the data of the first application over data of the second application at each protocol layer.

8. The method of claim 7, wherein the data of the first application and the data of the second application have a same quality control indicator (QCI) rating.

9. The method of claim 7, further comprising determining, by the processor, the first application has the higher priority by referring to a network data store configured to store priority information associated with the first application.

10. The method of claim 7, further comprising receiving, by the processor, a message from the first application comprising priority information associated with the first application.

11. The method of claim 7, further comprising storing, by the processor, priority information associated with the first application identified by a manufacturer of the electronic device.

12. The method of claim 7, further comprising receiving, by the processor, an over-the-air communication comprising priority information associated with the first application.

13. The method of claim 7, further comprising prioritizing, by the processor, data of the first application over data of the second application at each protocol layer by at least one of cutting ahead in a queue at each protocol layer or prioritizing scheduling of one or more packets of the data of the first application at each protocol layer.

14. A non-transitory computer readable storage medium comprising instructions that, when executed by a processor, cause the processor to perform operations comprising:
    identifying, by the processor, a data radio bearer (DRB) channel assigned to data of a first application and data of a second application of a user device, wherein the DRB channel is associated with a first set of priority parameters;
    establishing, by the processor, for each protocol layer of a communication protocol stack, an application transport bearer (ATB) channel having a second set of priority parameters, wherein the second set of priority parameters are higher in priority than the first set of priority parameters; and
    prioritizing, by the processor, transmission of the data of the first application over the data of the second application by associating the data of the first application to the ATB channel at each protocol layer.

15. The non-transitory computer readable medium of claim 14, wherein the data of the first application and the data of the second application have a same quality control indicator (QCI) rating.

16. The non-transitory computer readable medium of claim 14, the operations further comprising:
    receiving, by the processor, a message comprising information identifying the DRB channel assigned to the data of the first application and the data of the second application.

17. The non-transitory computer readable medium of claim 14, the operations further comprising:
    determining, by the processor, that the data of the first application of an electronic device has the higher priority than the data of a second application of the electronic device.

18. The non-transitory computer readable medium of claim 17, wherein determining that the data of the first application of an electronic device has the higher priority than the data of a second application of the electronic device comprises at least one of: referring to a network data store configured to store priority information associated with the first application, receiving a message from the first application comprising priority information associated with the first application, storing priority information associated with the first application identified by a manufacturer of the electronic device, or receiving an over-the-air communication comprising priority information associated with the first application.

19. The non-transitory computer readable medium of claim 14, wherein prioritizing the data of the first application over the data of the second application at each protocol layer by at least one of: cutting ahead in a queue at each protocol layer or prioritizing scheduling of one or more packets of the data of the first application at each protocol layer.

20. The non-transitory computer readable medium of claim 14, wherein the protocol layer is at least one of a Packet Data Convergence Protocol (PDCP) layer, a Radio Link Control (RLC) layer, or a Media Access Control (MAC) layer.

* * * * *